(12) United States Patent
Kozak et al.

(10) Patent No.: US 8,215,206 B2
(45) Date of Patent: *Jul. 10, 2012

(54) DAMAGED BOLT AND SCREW REMOVING DEVICES

(75) Inventors: Burton Kozak, Chicago, IL (US); Ira Kozak, Riverwoods, IL (US)

(73) Assignee: Combined Products Co. #1 Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/985,099

(22) Filed: Nov. 14, 2007

(65) Prior Publication Data

US 2009/0183603 A1    Jul. 23, 2009

Related U.S. Application Data

(63) Continuation-in-part of application No. 11/255,424, filed on Oct. 22, 2005, now abandoned, which is a continuation of application No. 10/831,391, filed on Apr. 23, 2004, now Pat. No. 6,978,679.

(60) Provisional application No. 60/465,506, filed on Apr. 25, 2003.

(51) Int. Cl.
*B25B 13/50* (2006.01)

(52) U.S. Cl. ......................................... 81/53.2; 81/441

(58) Field of Classification Search .................... 81/53.2, 81/441, 459; 408/410, 411, 216, 217, 223–225, 408/227, 229, 230
See application file for complete search history.

(56) References Cited

U.S. PATENT DOCUMENTS

| | | | |
|---|---|---|---|
| 673,056 | A | 4/1901 | Jacobs |
| 1,105,535 | A | 7/1914 | Roberts |
| 1,129,049 | A | 2/1915 | Smith |
| 1,863,045 | A | 6/1932 | Randall |
| 1,863,046 | A | 6/1932 | Githens |
| 2,103,944 | A | 12/1937 | Gullborg |
| 2,066,132 | A | 8/1949 | Zihler |
| 2,480,648 | A | 8/1949 | Harer |
| 3,135,306 | A | 6/1964 | Mangerian |
| 3,161,090 | A | 12/1964 | McLellan |
| 3,392,767 | A | 7/1968 | Stillwagon |
| 3,517,714 | A | 6/1970 | Desbarats |
| 3,590,235 | A | 6/1971 | Leo |
| 3,604,488 | A | 9/1971 | Wishart |
| 3,678,789 | A | 7/1972 | Wilson |
| 3,739,825 | A | 6/1973 | Knox |

(Continued)

FOREIGN PATENT DOCUMENTS

WO    WO 01/66310    9/2001

(Continued)

*Primary Examiner* — Debra S Meislin

(74) *Attorney, Agent, or Firm* — Factor Intellectual Property Law Group

(57) ABSTRACT

A bit for removing a broken fastener comprises a tip from which extend two or more notches separated by traction or biting surfaces formed from two-sided frusto-conically-shaped regions. The surfaces are bounded on one side by a nonlinear cutting edge and on the other side by a non-cutting edge and are configured to cut into the fastener when the bit is rotated in a direction opposite to the fastener's direction of engagement. Specific embodiments include configurations where the cutting edges extend at different angles with respect to the bit axis, where the biting surfaces comprise a plurality of serrations, and where the cutting edges are separated by flutes which spiral along a longitudinally extending periphery of the bit.

18 Claims, 14 Drawing Sheets

U.S. PATENT DOCUMENTS

| | | |
|---|---|---|
| 4,189,266 A | 2/1980 | Koslow |
| 4,429,599 A | 2/1984 | La Sante |
| 4,569,259 A | 2/1986 | Rubin |
| 4,604,917 A | 8/1986 | Polonsky |
| 4,682,917 A | 7/1987 | Williams |
| 4,716,793 A | 1/1988 | Tauber |
| 4,777,850 A | 10/1988 | Polonsky |
| 4,800,787 A | 1/1989 | Cerny |
| 5,031,487 A | 7/1991 | Polonsky |
| D329,786 S | 9/1992 | Polonsky |
| 5,160,232 A * | 11/1992 | Maier ............ 408/223 |
| D340,184 S | 10/1993 | Desaulniers |
| 5,251,516 A | 10/1993 | Desaulniers |
| 5,450,776 A | 9/1995 | Kozak |
| 5,452,971 A * | 9/1995 | Nevills ............ 408/230 |
| 5,520,075 A | 5/1996 | Barmore |
| 5,533,426 A | 7/1996 | Morales |
| 5,551,320 A | 9/1996 | Horobec |
| 5,827,019 A | 10/1998 | Morrissey |
| 6,047,620 A | 4/2000 | Kozak |
| 6,213,692 B1 * | 4/2001 | Guehring et al. ............ 408/144 |
| 6,431,801 B2 * | 8/2002 | Vasudeva et al. ............ 408/211 |
| 6,595,730 B2 | 7/2003 | Bergamo |
| 6,742,416 B2 | 6/2004 | Bergamo |
| 6,957,937 B2 * | 10/2005 | Vasudeva ............ 408/211 |
| 2002/0127071 A1 * | 9/2002 | Vasudeva ............ 408/213 |
| 2003/0136228 A1 | 7/2003 | Liu |
| 2004/0134688 A1 | 7/2004 | Papousek |
| 2006/0150780 A1 * | 7/2006 | Chen ............ 81/53.2 |
| 2006/0191379 A1 | 8/2006 | McCalley |

FOREIGN PATENT DOCUMENTS

| | | |
|---|---|---|
| WO | WO 2004/002687 | 1/2004 |

\* cited by examiner

Fig. 1aa
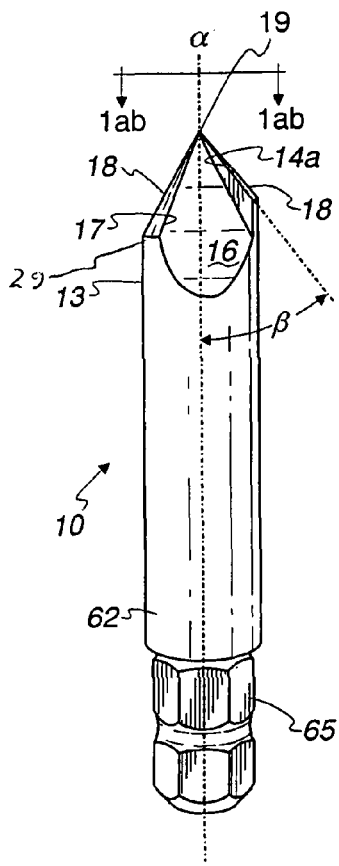
Fig. 1ac
Fig. 1ba
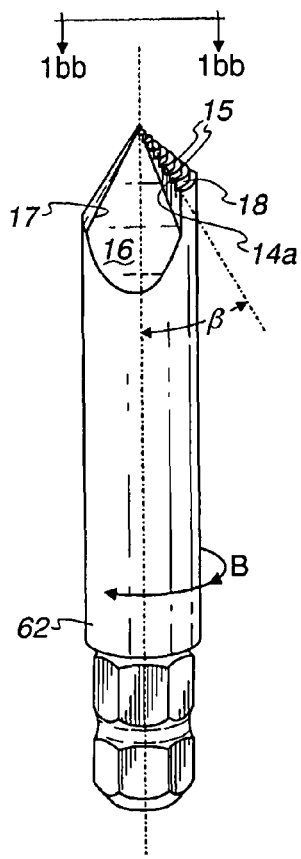
Fig. 1ab
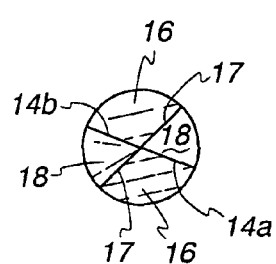
Fig. 1bc
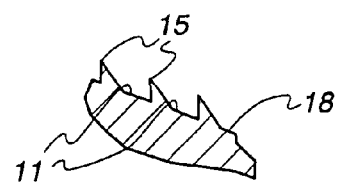
Fig. 1bb
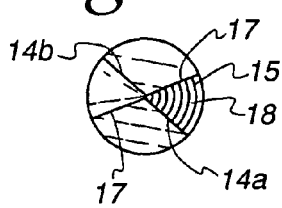

DAMAGED BOLT AND SCREW REMOVING DEVICES

This patent application is a Continuation in Part of U.S. Utility patent application Ser. No. 11/255,424 filed Oct. 22, 2005, now abandoned, which is a Continuation in Part of U.S. Utility patent application Ser. No. 10/831,391 filed Apr. 23, 2004, issued on Dec. 27, 2005 as U.S. Pat. No. 6,978,679 which claims the benefit of U.S. Provisional Patent Application Ser. No. 60/465,506; filed on Apr. 25, 2003, the entirety of these applications being incorporated herein by reference.

BACKGROUND OF THE INVENTION

1. Field of the Invention

The present invention relates to the field of hardware tool bits, and more particularly, the present invention relates to a device for removing damaged fasteners still embedded or otherwise engaged with a workpiece.

2. Description of the Prior Art

The use of fasteners, such as screws, bolts, and other threaded joining devices continues to increase. However, the more a fastener is used, the more likely that its head becomes rounded off, or the fastener is broken, or otherwise rendered useless. At that point, the fasteners must be removed, and/or the workpiece replaced or abandoned.

A myriad of screw removing bits exist. Generally, the bits are typical in that each utilizes a rotating tool shaft, such as the shaft of a screw driver, either manually or power-driven. The second end of the bit is configured to impart rotational torque to the fastener while the latter is still held fast by the workpiece.

The second end of the bit mimics the end of a standard drill bit. Several broken bolt extractors feature a left-handed cutting edge. For example, U.S. Pat. No. 4,777,850 discloses two such edges. However, such devices still require considerable power to impart the rotational torque necessary to "bite" into the fastener to begin left-handed extraction.

U.S. Pat. No. 6,595,730 B2 awarded to Bergamo on Jul. 22, 2003 discloses a bit for removing damaged screws. This device is designed to engage the exterior surface of the fasteners and not interior surfaces of the fastener. As such, "purchase" of the fastener by the device is relegated to that exterior surface.

Another example of a prior art extraction device is the tool disclosed in German patent DE 19526631 A1. The tool depicts two cutting edges that drill a hole in a "frozen" screw/bolt or rivet when rotated in a first direction. The two cutting edges also are suitable for loosening the same fastener after drilling the hole in the fastener thereby providing a single tool that performs two functions to reduce the extraction time to remove a fastener from a workpiece. The problem with this tool is that a recess must be present in the fastener to better facilitate removal from the workpiece. The German tool cannot be used to remove a fastener having a slotted surface configuration unless the fastener includes a recess with a depth sufficient to allow the two cutting edges to insert therein. Otherwise, the slotted head fastener would be damaged during removal.

A need exists in the art for a broken bolt or broken screw extraction device to facilitate easier removal of fasteners held tight by a workpiece. The device should be able to be utilized with hand-actuated handles or with electrically activated (including battery operated) tools. The device should engage as much of the interior surface of a wayward fastener so as to decrease the likelihood of a spin off of the device from the fastener while concomitantly increasing the likelihood of extraction of the fastener with minimal force required.

SUMMARY OF THE INVENTION

It is an object of the present invention to provide a broken bolt or broken screw remover that overcomes many of the disadvantages of the prior art.

It is a further object of the present invention to provide a broken bolt/screw remover bit that requires only low levels of torque to extract a fastener. A feature of the invention is that the bit has a pair of generally radially projecting cutting edges, with each of the cutting edges defining an angle with respect to the axis of the remover and a periphery of a frusto-conical surface. The cutting edges may be linear or curved. Each of these surfaces forms an acute angle with respect to the axis of the bit. An advantage of the invention is that the different cutting edge angles enhance the bite of the bit into interior surfaces of the fastener. The cutting edges can contain serrations running substantially perpendicular to the longitudinal axis of the cutting edge to provide additional purchase of the fastener. Also the serrations may form an acute or an obtuse angle with the cutting edge. The serrations allow the bit to effectively extract wayward fasteners at bit rotation speeds of as low as 0.25 RPM to as high as typical RPM values of commercially available electric screw drivers and power tools. Hand-actuated screw drivers, by comparison, are typically turned one quarter turn per wrist roll such that 30 RPM is typical for a non-powered hand tool.

Yet another object of the present invention is to provide a broken bolt/screw remover which also has drilling function. A feature of the invention is that it comprises a left-handed countersink drill bit containing serrations which extend from a cutting edge of the bit. An advantage of the invention is that the drilling feature of the remover causes more interior surfaces of the fastener to be made available to the cutting edges and the serrations, so as to assure simultaneous withdrawal of the remover with the fastener attached to the bit while leaving the threaded cavity in the workpiece intact.

Still another object of the present invention is to provide a step drill with fastener remover capabilities. A feature of an embodiment of the invention is a plurality of generally longitudinally-extending serrations interposed between axially spaced steps in the drill bit. These serrations extend in a left hand cutting fashion from a cutting edge of the bit. An advantage of the invention is that this embodiment can be utilized to extract fasteners having a myriad of different shank diameters.

Briefly, the invention provides a bit for removing a broken fastener having a direction of engagement, said bit comprising an elongated shaft with a longitudinal axis, said shaft having a first end, and a second end, said first end terminating in a drilling tip; a plurality of linear or nonlinear cutting edges extending radially from said tip, with each of the cutting edges defining a frusto-conical surface with serrations thereon, said cutting edges configured to cut into the fastener when the bit is rotated in a direction opposite to the fastener's direction of engagement; and said second end of the shaft configured to be received by a tool which provides rotational torque.

BRIEF DESCRIPTION OF THE DRAWING

The foregoing invention and its advantages may be readily appreciated from the following detailed description of the invention, when read in conjunction with the accompanying drawing in which:

FIG. 1aa is an elevational view of the invented bit, in accordance with features of the present invention;

FIG. 1ab is a top view of FIG. 1aa taken along the line 1ab-1ab;

FIG. 1ac is an elevational view of FIG. 1aa rotated 180 degrees around its longitudinal axis, in accordance with features of the present invention;

FIG. 1ba is an elevational view of the invented bit with serrated regions, in accordance with features of the present invention;

FIG. 1bb is a top view of FIG. 1ba taken along the line 1ba-1ba;

FIG. 1bc is an expanded view of the invented bit with serrated regions depicted in FIG. 1ba, in accordance with features of the present invention;

FIG. 1cb is a top view of FIG. 1ca taken along the line 1cb-1cb;

FIG. 1cc is an elevational view of an alternate invented bit with serrated regions, in accordance with features of the present invention;

FIG. 1cd is a top view of FIG. 1cc taken along the line 1cd-1cd;

FIG. 1db is a detailed view of an alternate configuration of the serrated regions depicted in FIG. 1ba, in accordance with features of the present invention;

FIG. 13b is a top view of an alternate embodiment of the invented bit of taken along the line 13b-13b of FIG. 13a.

DETAILED DESCRIPTION OF THE INVENTION

Figure 1C:
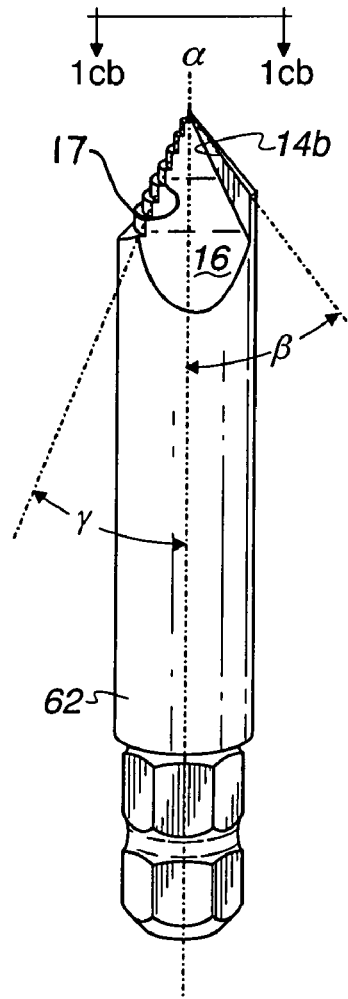
FIG. 1ca is an elevational view of an alternate invented bit with serrated regions, in accordance with features of the present invention.
Figure 1C:
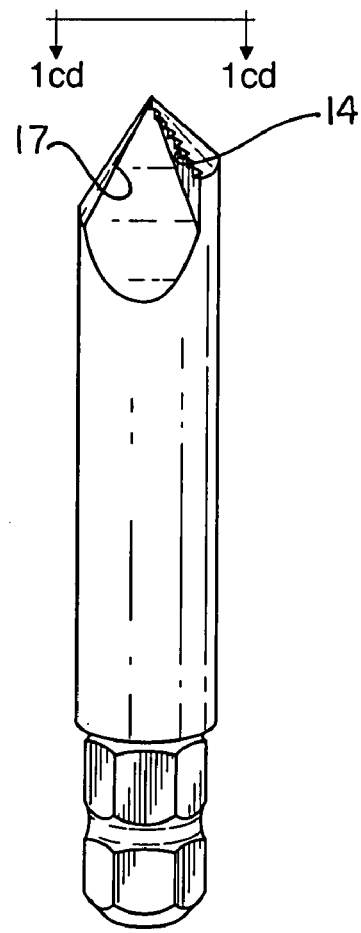
Figure 1C:
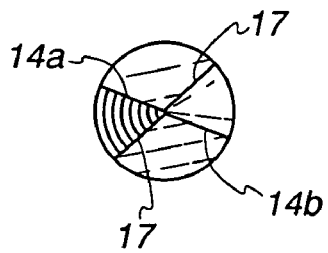
Figure 1C:
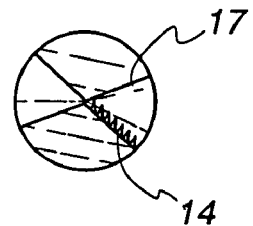

The present invention provides a bit configuration and various bit/threaded configurations on a single device to allow for easier fastener extraction. More specifically, the present invention provides a bit for removing a broken fastener having a direction of engagement, said bit comprising: (a) an elongated shaft with a longitudinal axis, said shaft having a first end, and a second end, said first end terminating in a tip region; (b) a plurality of non-cutting edges and of nonlinear cutting edges extending from said tip region, said cutting edges configured to cut into the fastener when the bit is rotated in a direction opposite to the fastener's direction of engagement, and said cutting edges and said non-cutting edges alternating with each-other; (c) a plurality of frusto-conical traction surfaces each extending from one said cutting edge to a non-cutting edge, wherein one or more of said surfaces comprise a plurality of serrations; and (d) said second end of the shaft configured to be received by a tool which provides rotational torque. In an embodiment of the invention, the tip defines the tip of a drill-bit.

FIG. 1aa provides salient features of the invented bit, the bit designated generally as numeral 10. As with any typical bit, the bit generally comprises a shaft 12 with a first end 13 terminating in a tip 19. While the tip 19 is depicted as generally pointed, standard split tips also can be utilized such that cutting surfaces 14 are not coplanarly aligned with each other or with the tip. This split point configuration minimizes and even prevents "walk out" of the bit from the workpiece. As such, the configuration serves as a means for maintaining the bit on the fastener during rotational motion of the bit.

A second end 65 of the bit is configured to be received by a tool which imparts rotating torque, including but not limited to a chuck, or collet (or some other means for imparting torque). As such, a cross section of the second end can be circular, hexagonal, polygonal or any convenient shape to facilitate the tip being acted upon with rotational torque.

Figure 7A:
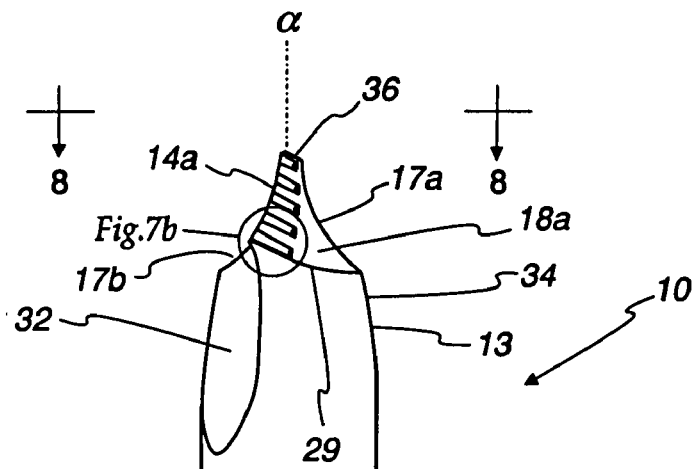
FIG. 7a is an elevation view of a extraction tool depicting non-linear cutting surfaces, in accordance with features of the present invention.

The bit typically comprises two longitudinally extending notches 16, each of the notches terminated on one side with a leading or cutting edge 14. The other side of the notch is bounded by a non-cutting edge 17. Both the cutting edge 14 and the non-cutting edge extend from a point proximal to the axis α, to the bit periphery. One or more notches are acceptable, but, for the sake of specificity, the following discussion will focus on two-notched configurations. In a two-notch embodiment, two frusto-conically-shaped regions, diametrically opposed to each other, are presented. One or both of the regions contain serrations as defined infra. The cutting edge 14 faces in a counter-clock-wise direction for extracting a fastener with a clockwise direction of engagement and conversely for a counterclockwise fastener. Between the cutting edge and the non-cutting edge is a biting or traction-enhancing surface 18 which can be described as a section of a frusto-conically-shaped region. The biting surface 18 is bound by the cutting edge 14 and non-cutting edge 17. In one embodiment of the invention, as shown in FIG. 1aa, the cutting edge 14 and the noncutting edge 17 define the same angle with respect to the axis a of the bit so that the intersection 29 of the frusto-conical surface 18 with the bit periphery 13 is an arc of a circle. FIG. 7a depicts another embodiment wherein the non-cutting edge 17a forms a more acute angle γ with respect to the axis α than the cutting edge 14a.

The cutting edge 14 defines an angle β to the longitudinal axis α of the bit. FIG. 1ac depicts an extraction device designed to rotate clockwise to extract a left hand fastener. FIG. 1ab is a top view of FIG. 1aa taken along the line 1ab-1ab.

Surprisingly and unexpectedly, the inventor has found that the difference in the cutting edge angles facilitates greater bite into the shank of the broken fastener. The first angle β can differ from the second angle γ by as much as 50 percent. For example, whereas the first angle is 45 degrees, the second angle γ is 30 degrees. Ideally, the sum of the angles is such that any remaining slot of a broken fastener can simultaneously contact at least portions of each of the cutting edges 14 and 14b. While the cutting edges depicted in FIG. 1aa are rectilinear, in an alternative embodiment depicted in FIGS. 7a, 8-9, 10a through 10f and 13-14 the cutting edges define a curved edge facing opposite to the fastener's direction of engagement.

As an alternative to the bit having a straight cutting edge 14a as depicted in FIGS. 1aa and 1ac, one of the edges 14a is serrated, curved or both. Serrated edges are depicted in FIG. 1ba. (FIG. 1bb is a top view of FIG. 1ba taken along the line 1bb-1bb.) The serrations 15 start along at least a substantial length of the cutting edge 14a, and extend transversely from the cutting edge in a right handed direction (i.e. opposite the direction of rotation of the bit in use). In FIG. 1bb, the serrations define ridges or "teeth" 15 on the frusto-conical surface 18 that run circumferentially parallel to the periphery of the bit. In this embodiment, the serrations are curved. The serrations can extend completely across the frusto-conical surface 18 so as to terminate at the non-cutting edge 17 (See FIGS. 1ba and 1ca), or else the serrations terminate at a region of the surface 18 intermediate the cutting edge 14 and non-cutting edge 17 (See FIG. 1cc and FIG. 1cd which is a top view of FIG. 1cc taken along the line 1cd-1cd). The serrations define a series of teeth 15 with gaps 11 between the teeth, as shown in the detail in FIG. 1bc. (Throughout this application, where the cutting edges 14 are different from each-other they are designated as 14a and 14b. The same is true for the non-cutting edges 17 and the surfaces 18.)

Surprisingly, and unexpectedly, the inventors found that engagement between the removal device and the broken fastener is enhanced if the teeth 15 on the traction surfaces 18 are axially asymmetric. This can be accomplished by a variety of means. In embodiments depicted in FIGS. 8-10, the serrations are straight, but are of different lengths, with the longer serrations radially displaced further from the bit's axis α than the shorter serrations.

Figure 13A:
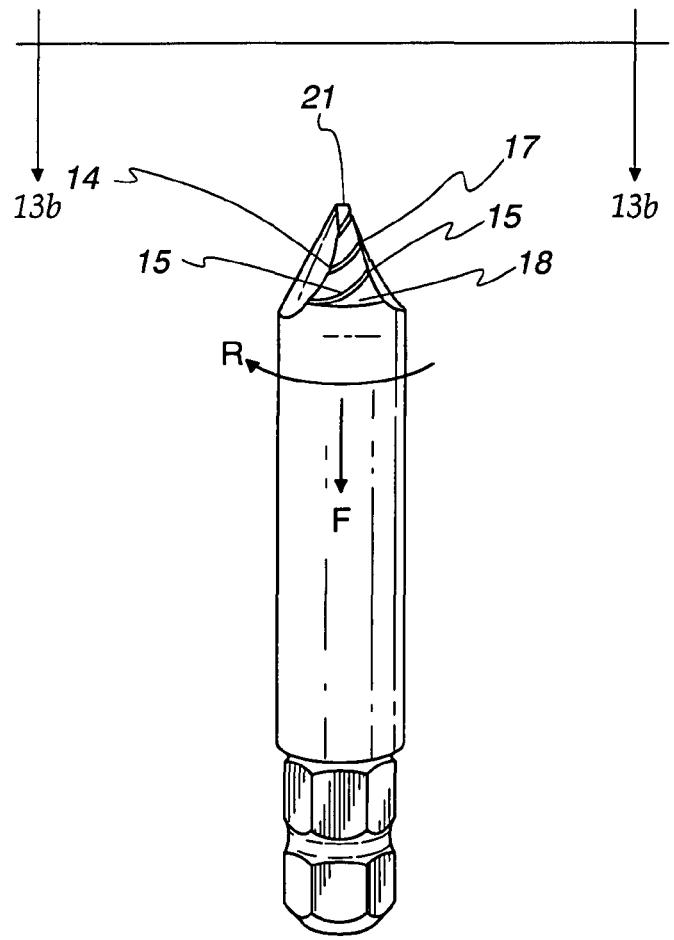
FIG. 13a is a side view of an alternate embodiment of the invented bit in accordance with features of the present invention.
Figure 13B:
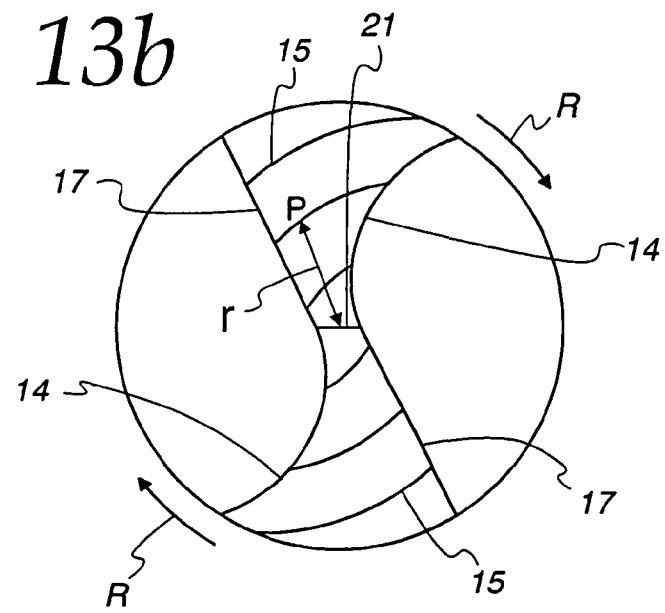

In the embodiment depicted in FIG. 13, the serrations are curved and parallel to each other but not circumferentially parallel to the bit periphery. As depicted in FIG. 1cd the teeth can stop on the surface 18 between the cutting edge 14 and non-cutting edge 17. In such a situation the gap 11 between the teeth 15 may either remain uniformly deep or decrease in depth as the serration extends towards the non-cutting edge 17. Other non-axially-symmetric configurations for said ridges are shown in FIGS. 7a and 7b, 8, 9, 10a through 10f, 13a and 13b, and 14.

FIG. 1ca depicts the drill tip region diametrically opposed to the region depicted in FIG. 1ba except it is the biting surface at an angle γ with respect to the axis that bears the serrations. FIG. 1cb is a top view of FIG. 1ca taken along the line 1cb-1cb. It should be appreciated that inasmuch as the cutting edge 14a is, along its entire length (except at the tip 19 of the bit), radially displaced a greater distance from the bit's axis α and than the noncutting edge 17, the fusto-conical surface 18 situated intermediate the two edges define a radially-directed slope from the cutting edge to the noncutting edge.

The inventors have found that having one cutting edge serrated, and the immediate next cutting edge smooth enhances "bite" of that smooth cutting edge into the fastener for easier extraction from the workpiece. This alternating serrated/smooth cutting edge configuration provides a double action whereby the serrated edge roughens the topography of the fastener surface, thereby serving as a means for enhancing purchase of the smooth cutting surface with the fastener.

A plurality of cutting edges on the same bit can be serrated (even on adjacent edges as opposed to a smooth edge intermediate two serrated edges), with one configuration having edges biting into the fastener at different axial locations from each other. The inventive feature of varying the angle of attack of the edges (e.g., the angles β and γ, discussed supra) will minimize the possibility of adjacent serrated edges destroying the carcass of the fastener before the bit can anchor into the carcass for removal.

Figure 1D:
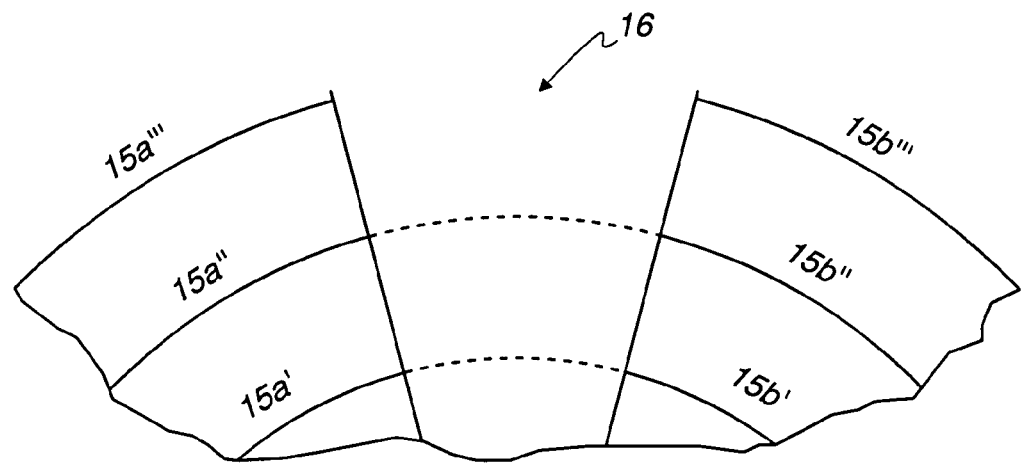
FIG. 1da is a detailed view of the serrated regions depicted in FIG. 1ba, in accordance with features of the present invention.
Figure 1D:
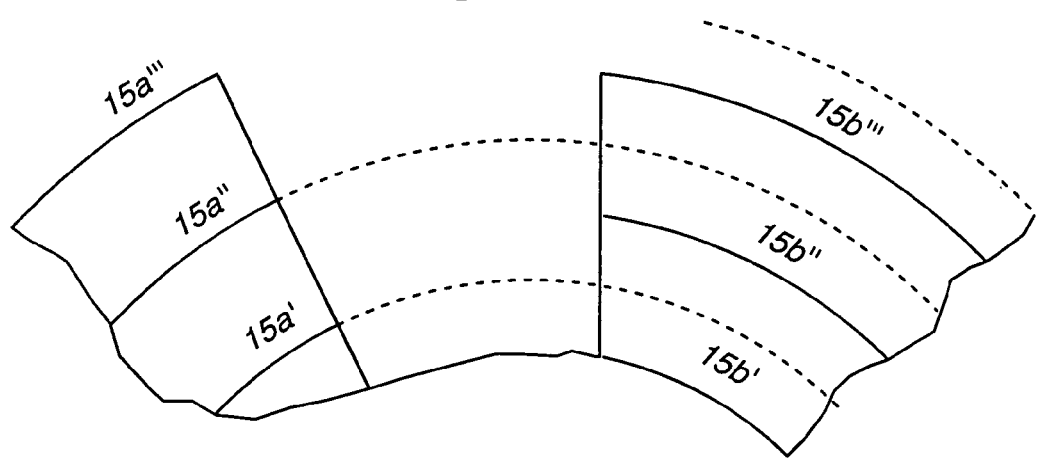

There are many possible variations in the configuration of the serrations. For instance, a possible embodiment is where serrations are provided on two cutting edges that are at the same angle with respect to the bit axis, with the serrations defining two sets of teeth 15 with separated by gaps 11. FIGS. 1da and 1db depict two possible variations within this embodiment. In FIG. 1da corresponding teeth 15a'-15b', 15a''-15b'', 15a'''-15b''', etc. . . on the two surfaces are azimuthally aligned across a notch 16 while in FIG. 1db corresponding teeth are axially displaced with respect to those on the other side of the notch so as to be azimuthally aligned with the gaps on the other side. The staggered serration configuration provides a means for serrations biting at different radial and axial regions of the fastener. In other words, serrations which are azimuthally aligned with each other are those serrations which are positioned the same radial distance perpendicular to the longitudinal axis of the bit.

Figure 6A:
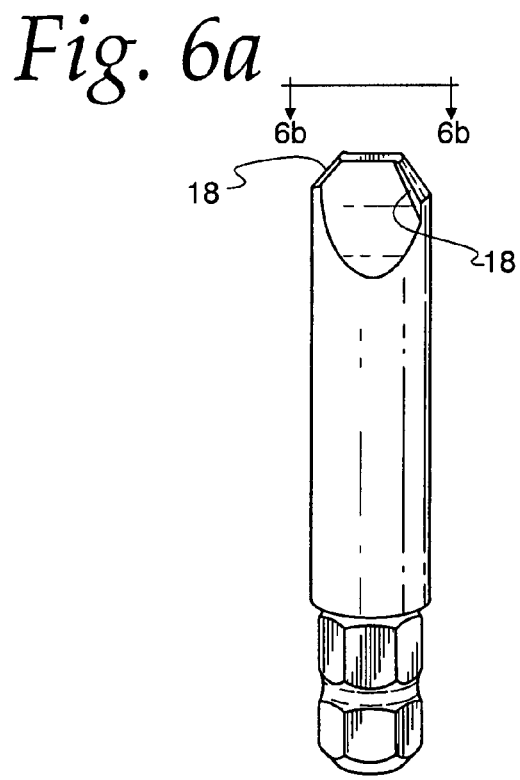
FIG. 6a is an elevational view of a modification of the invented bit, in accordance with features of the present invention.
Figure 6B:
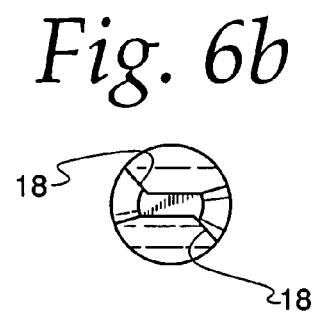
FIG. 6b is a top view of FIG. 6a taken along the line 6b-6b.

Furthermore, it should be noted that the invented bits need not terminate into a sharp apex. Rather, bits terminating in rounded or blunted apexes are suitable for fasteners having particularly large-diameter shanks or for fasteners where a central cavity has been fashioned during a previous attempt to extract the fastener. FIG. 6a depicts an exemplary embodiment of such a blunted apex bit where the biting surfaces 18 are inclined at different angles with respect to the axes (See FIG. 1ca) and may also comprise serrations (See FIG. 1ba). FIG. 6b is a top view of FIG. 6a taken along the line 6b-6b.

Figure 2A:
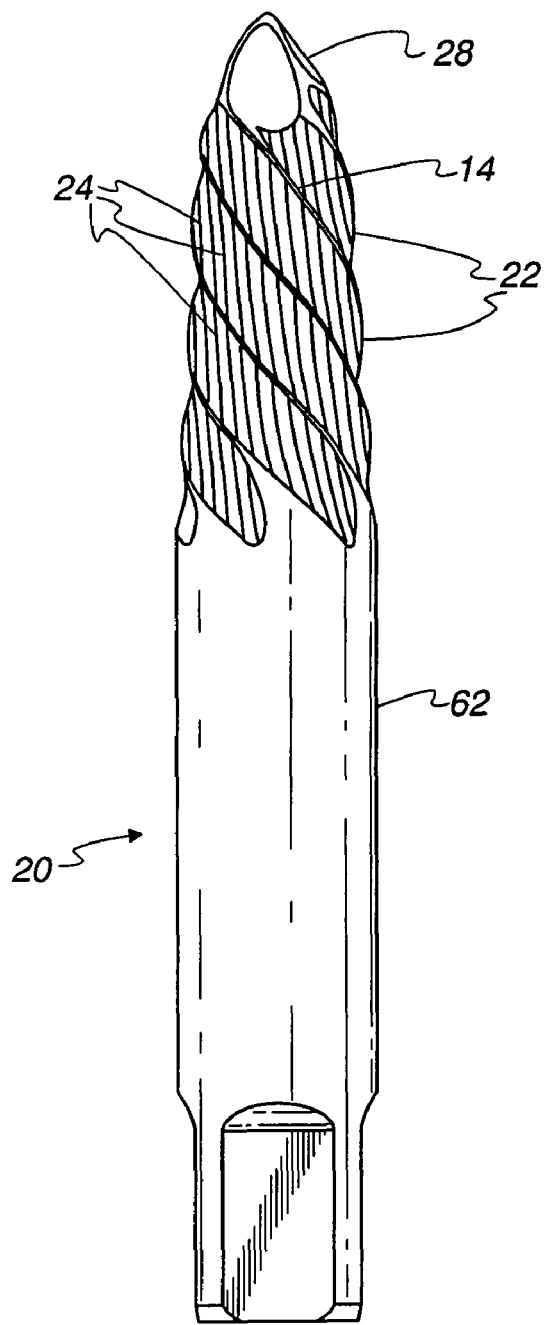
FIG. 2a is an elevational view of an easy out bit further defining a left handed drill bit with serration portions, in accordance with features of the present invention.

FIG. 2a depicts an embodiment of the invented broken fastener remover, designated as numeral 20, which comprises a standard "easy out" configuration (whereby the easy out defines a tapering, left handed spiral). This embodiment comprises a plurality of left-handed cutting surfaces 22 terminating in a drill tip 28. The tip 28 can have the configuration described in FIGS. 1aa and 1ba.

Figure 2B:
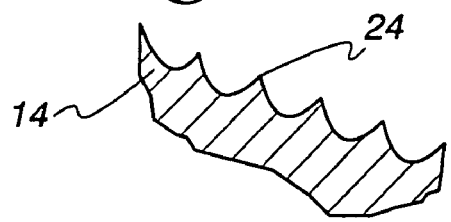
FIG. 2b is an expanded view of the cutting edge of FIG. 2a, in accordance with features of the present invention.

Also, the fastener remover bit 20 with the easy out configuration can include a plurality of serrations 24 extending from the cutting edge(s) 22 of the bit 20. These cutting edges 22 define helical regions extending circumferentially along the periphery of the bit 20 and generally parallel to the longitudinal axis α of the bit. The serrations can exist along one or more than one of the cutting edges 14 of the bit. A salient feature of this embodiment is that the left hand serrations 24 extend parallel to the longitudinal axis α of the bit. These serrations bite in to the recess of the screw head. FIG. 2b depicts a detail of a cutting edge 14 showing that the serrations 24 define teeth 25 on the cutting edge 14 of the spiral cutting surface 22.

Figure 3A:
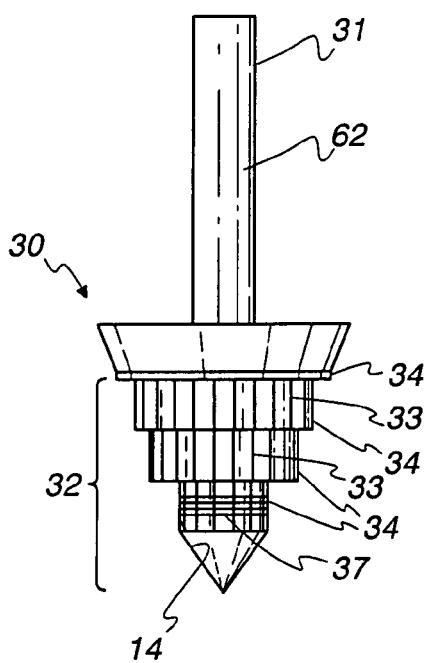
FIG. 3a is a side view of a step drill bit with cutting threads, in accordance with features of the present invention.
Figure 3B:
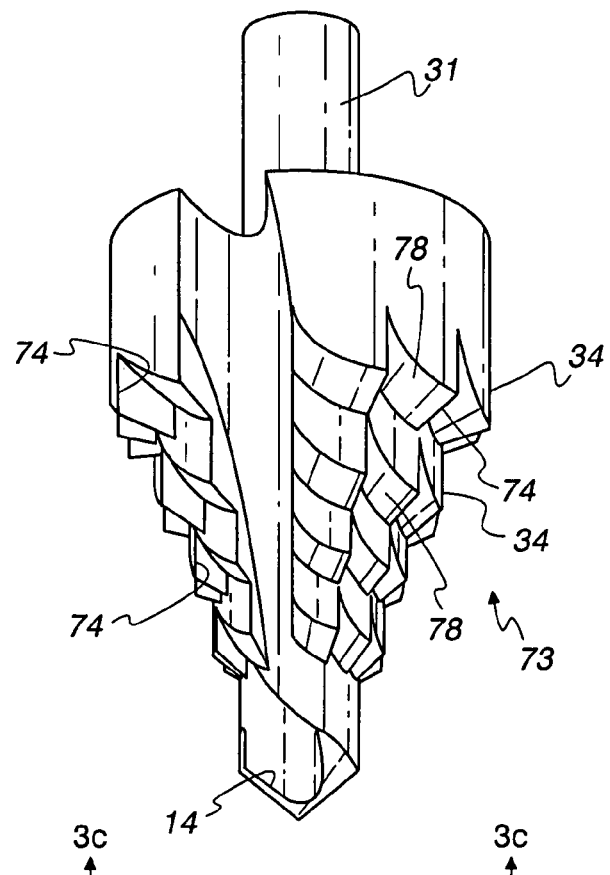
FIG. 3b is a side view of an alternate step drill bit with serration portions, in accordance with features of the present invention.

FIGS. 3a and 3b depict a fastener removal bit designated as numerals 30 and 73, respectively. This removal bit 30 has a first end 31 adapted to be received by a rotating handle or chuck, or collet (not shown). A second end 32 of the removal bit 30 terminates in a bit configuration similar to that depicted in FIGS. 1aa-1ba. Generally, the cutting region of the removal bit comprises a step configuration 32 and serration edges 33 positioned intermediate the steps 34 of the configuration such that the serrations extend radially from radially-facing surfaces of the steps. Also, these serration edges 33 generally extend parallel to the longitudinal axis of the bit 30, defining a left hand (counter-clockwise) cutting configuration.

In FIG. 3a, the steps 34 are axially spaced and otherwise arranged so that various fastener shank diameters can be accommodated with the removal bit 30. As such, steps have self-tapping screw threads 37 which are spaced apart to provide the anchoring necessary to withdraw the fastener in an axial direction once the bit is buried into the fastener shank, while the threaded cavity in the workpiece is left intact.

Figure 3C:
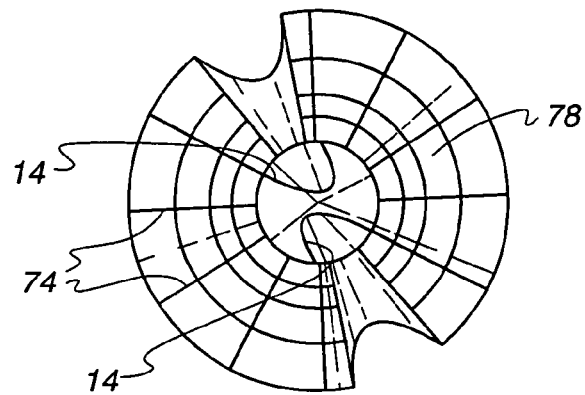
FIG. 3c is a top view of FIG. 3b taken along the line 3c-3c.

FIG. 3b depicts an alternative step bit 73, wherein the steps 34 are configured to comprise counter-clockwise cutting edges 74 and biting surfaces 78. More specifically, the bit 73 has a first end that terminates in a tip 72 with two or more notches 71 extending longitudinally along the shaft 31 from the tip, said notches separated by a plurality of cutting edges 74, said edges 74 arranged on biting surfaces 78 which are positioned along the axis and successively radially displaced further from the axis in a direction from the first end to the second end. The cutting edges are configured to cut into the fastener in progressive radial steps when the bit is rotated in a direction opposite to the fastener's direction of engagement at the same time as the cutting edges cut azimuthally into the fastener. Depending regions of biting surfaces 78 comprise a plurality of teeth 76, each of said teeth defining one cutting edge 74 adapted to bite the fastener in a direction along the longitudinal axis of the fastener. Thus each of the steps 34 constitutes a hole saw that bites into the fastener as the bit advances into the fastener. FIG. 3c is a view of FIG. 3b taken along line 3c-3c. The embodiment described in FIG. 3b may also comprise features described in conjunction with the embodiments described in FIGS. 1aa and 3a. Thus the bit 73 may comprise serration edges protruding from biting surfaces 78 and self-tapping screw threads on one or more of said surfaces. Also, two or more cutting edges 74 may have dissimilar angles with respect to the axis.

Figure 4A:
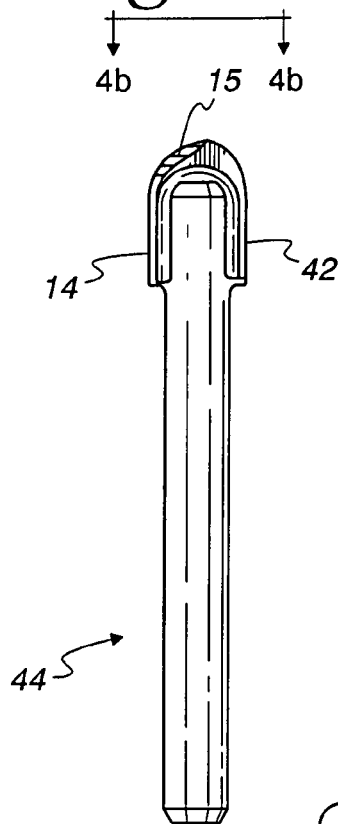
FIG. 4a is a perspective view of an alternative fastener extraction device, in accordance with features of the present invention.
Figure 4B:
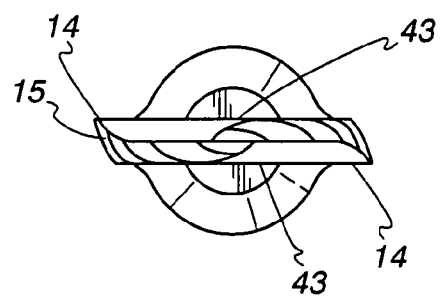
FIG. 4b is a top view of FIG. 4a taken along the line 4b-4b.

FIG. 4a depicts another bit, designated generally as numeral 44 and FIG. 4b is a top view of FIG. 4a taken along the line 4b-4b. This bit comprises a "glass drill" 44 in the shape of a solid rod, terminating with a carbide insert 42. The insert 42 consists of a 2-notch bit as depicted in FIGS. 1aa and 1ba in the limit where each of the notches 43 is between 150 and 180 degrees. Thus the present embodiment resembles a flat "spade" bit positioned transversely to the longitudinal axis of the rod. The distal end of the insert defines a plurality of left handed cutting edges 14, each which may or may not be at the same angle relative to the longitudinal axis of the rod. Optionally, one or both of these edges define biting surfaces that contain serrations 15 extending transversely from the cutting edge. Each of these edges are configured in a left handed configuration, so that right-hand fasteners are extracted thereby. However, and with all bits depicted herein, the cutting edges can be configured as right-hand facing so as to facilitate removal of left-handed fasteners.

Figure 5A:
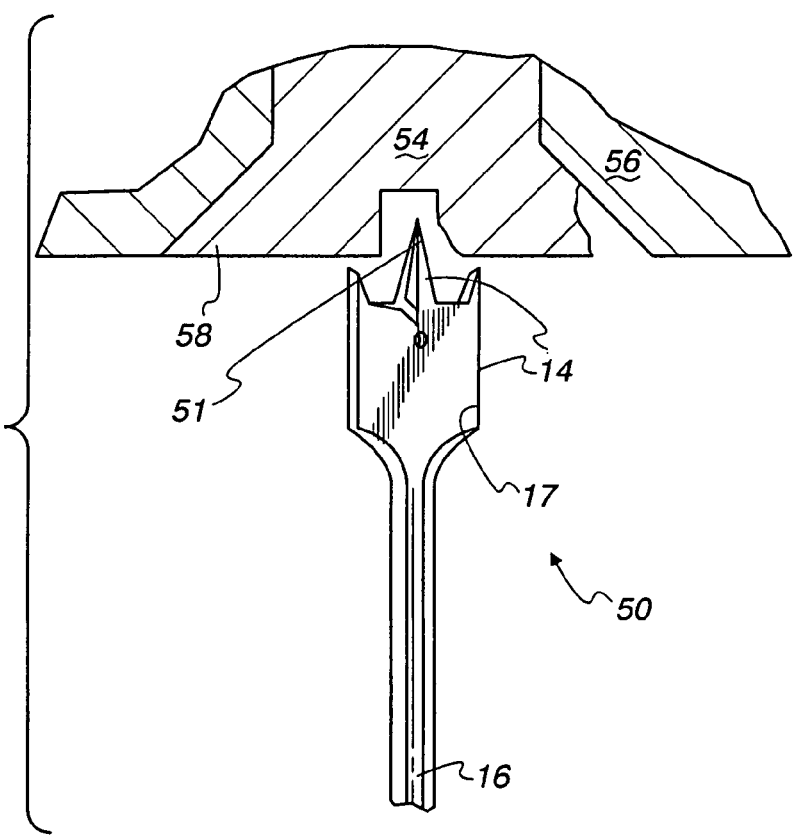
FIG. 5a is a modified spade flat, in accordance with features of the present invention.

The invented screw/bolt remover configuration can be integrally molded with other typical tool bits. For example, and as depicted in FIG. 5a, elements of the invented configuration depicted in FIGS. 1aa and 1ba can be integrally molded with a typical spade flat bit (FIG. 5a is a view of spade flat shown in slot of broken fastener) to optimize an already familiar tool. A typical spade drill comprises a shank 16 adapted to be received in the chuck, or collet of a torque-imparting tool, the shank terminating in a flat cutting element often called a "spade flat 52." The spade flat typically comprises cutting edges parallel to the shank and a cutting tip 51 aligned with the shank and/or side cutting tips 53 parallel to the shank but laterally displaced from the axis of the shank.

Figure 5B:
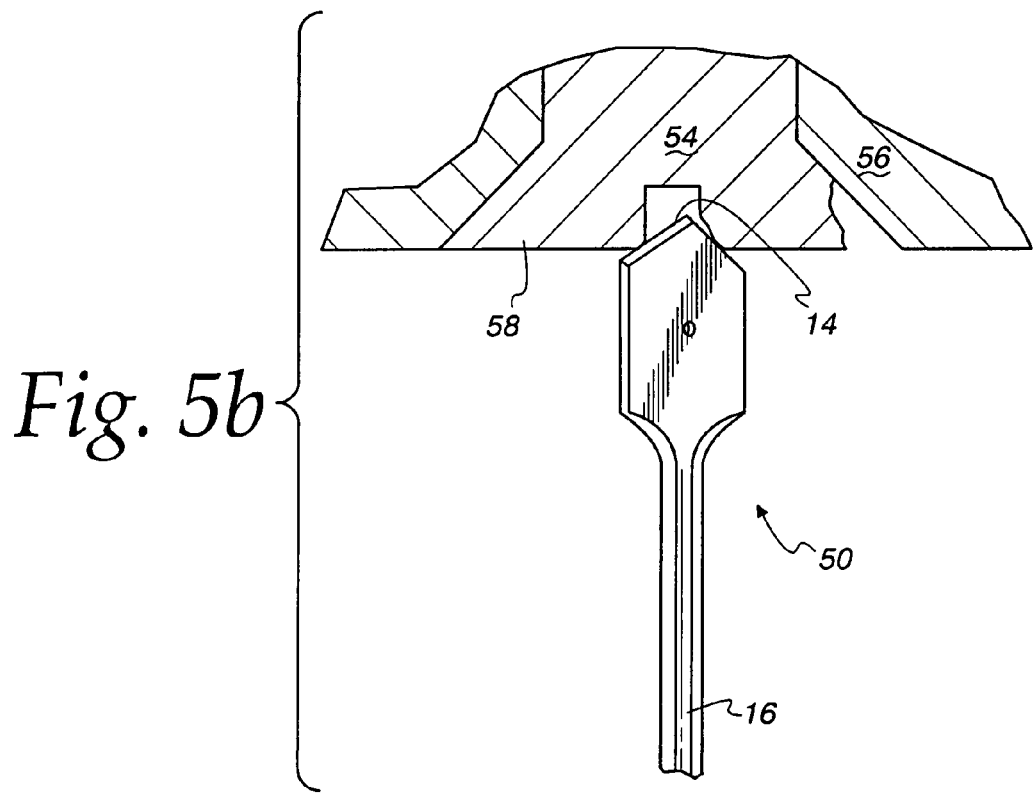
FIG. 5b is an alternate modified spade flat, in accordance with features of the present invention.

In FIGS. 5a and 5b the spade flat hybrid 50 is depicted as positioned at the slot of a broken screw 54, the screw countersunk into a workpiece 56. In operation, the cutting edges 14 of the spade flat hybrid 50 burrow into the head 58 of the screw. The center of the slot of the screw is shown as a pilot hole for the user of the hybrid bit 50.

In FIG. 5a the invented hybrid tool, designated as numeral 50 defines cutting edges 14 in a counter-clockwise facing position of the spade flat 52 and on a tip 51 similar to either of the configurations depicted in FIGS. 1aa and 1ba. The bit 50 also comprises side cutting tips 53.

In FIG. 5b the spade flat terminates in a triangular cutting element 59.

As with the embodiments depicted in FIG. 1, the spade flat can alternatively include a non-cutting edge and a biting surface, having either a smooth or serrated topology.

The spade flat depicts a ¼" size. However, this is for example only. Rather, a myriad of spade flat sizes are suitable, depending on the diameter of the residual fastener head 58 or shank remaining.

Another embodiment of a spade flat is depicted in FIG. 5b where the cutting edges 14 assume a triangular shape.

It should be noted that the above described embodiments all depict left handed cutting configurations. However, if left handed fasteners are to be removed, then the herein disclosed embodiments with right handed cutting configurations would be utilized.

It should be further noted that the opposed cutting edges in each of the above-disclosed embodiments generally are configured at angles to the longitudinal axis of the respective bit which are either identical to each other, or different from each other, on the same bit.

As mentioned supra, the cutting edges 14 and non-cutting edges 17 of the bit can be curved (i.e., nonlinear), as depicted in FIGS. 7, 8, 9, 10a through 10f, 13a, 13b, and 14. Curved cutting edges may be incorporated in all of the embodiments discussed supra.

Figure 7B:
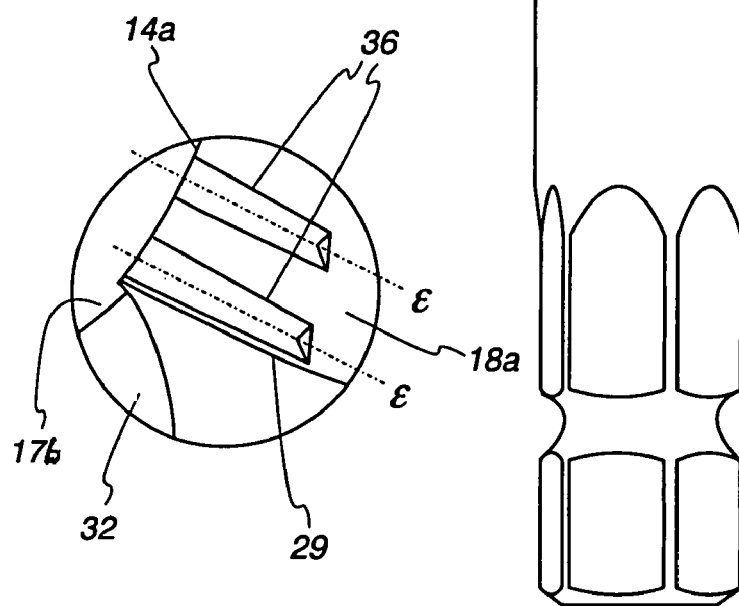
FIG. 7b is an exploded view of FIG. 7a showing details of cutting-edge serrations, in accordance with features of the present invention.
Figure 8:
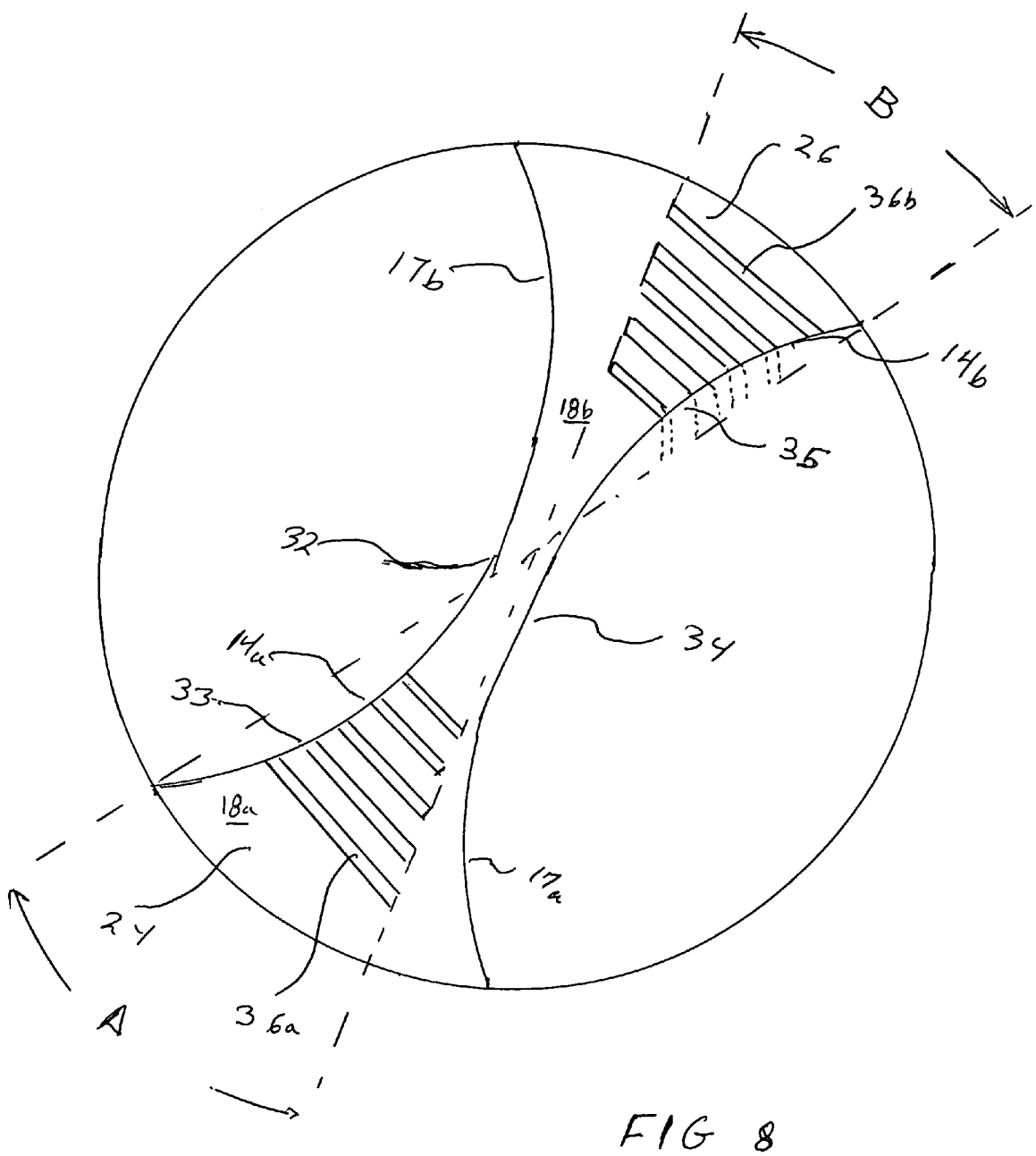
FIG. 8 is a view of FIG. 7a taken along the line 8-8.

FIG. 7a is a perspective view of an embodiment of the invented extractor bit with curved cutting edges (FIG. 7b is a detail of FIG. 7a and FIG. 8 is a view of FIG. 7a taken along line 8-8). Referring to the top elevation view of FIG. 8, the first and second nonlinear cutting edges 14a and 14b cooperate with the first and second non-cuffing edges 17a and 17b to form angles A and B which correspond to the radial arc of the notches 82, 84. These angles A and B define traction surfaces 18a (with serrations 36a) and 18b (with serrations 36b), with surface 18a being wider than 18b. FIG. 7a depicts lineal serrations 36 which extend in a direction generally orthogonal (i.e. along the direction .epsilon. in FIG. 7b) to a plane containing the longitudinal axis a of the tool 10. The serrations 36 in FIG. 7a constitute troughs or channels defining triangular cross-sections which reside in planes parallel to the bit longitudinal axis α (See detail in FIG. 7b). Extending from the curved edges are two notches 82, 84. In one embodiment, surface 18a is wider than 18b. Another embodiment is where the surfaces 18a and 18b are of the same width.

FIGS. 7a, 7b, and 8 depict an embodiment wherein the cutting edges 14a, 14b and the corresponding non-cutting edges 17a, 17b are not at the same angle with respect to the axis α of the bit. As shown in FIG. 7a, the non-cutting edge 17a forms a more acute angle with respect to the axis α than the cutting edge 14a so that the intersection 29 of the frusto-conical surface 18a with the bit periphery 13 is an arc of an ellipse. The advantage of this configuration where the non-cutting edge is at a steeper angle than the cutting edge is that the tip of the bit is made to wobble as it seeks to engage the broken fastener. This allows the extractor bit to better bite into the fastener head: the bit engages the fastener head at different angles as it turns and it can find an angle where its engagement is maximal. This wobbling also induces vibrations in the fastener with which the bit is in contact and these vibrations facilitate disengagement of the fastener from the workpiece.

The notches 82, 84 are shaped and reminiscent of the flutes of left hand drill bits. While the flutes of the illustrated embodiment extend generally along a straight line and longitudinally and parallel to the longitudinal axis of the bit, curved flutes are also suitable variants. Such flutes define an extended helix or spiral along a longitudinally extending section of the periphery of the bit and about its circumference. These curved flutes are further defined by serrations along their edges or rims which face in a direction the bit is to be rotated to extract fasteners. (See FIGS. 2a and 2b.) Thus, for jobs requiring extraction of right-hand fasteners, the serrations would be found on flute edges which face in a counterclockwise direction. A bit with a tip corresponding to the features depicted in FIG. 8 and with helical notches in fact constitutes a drill bit. (See FIG. 14).

Figure 9:
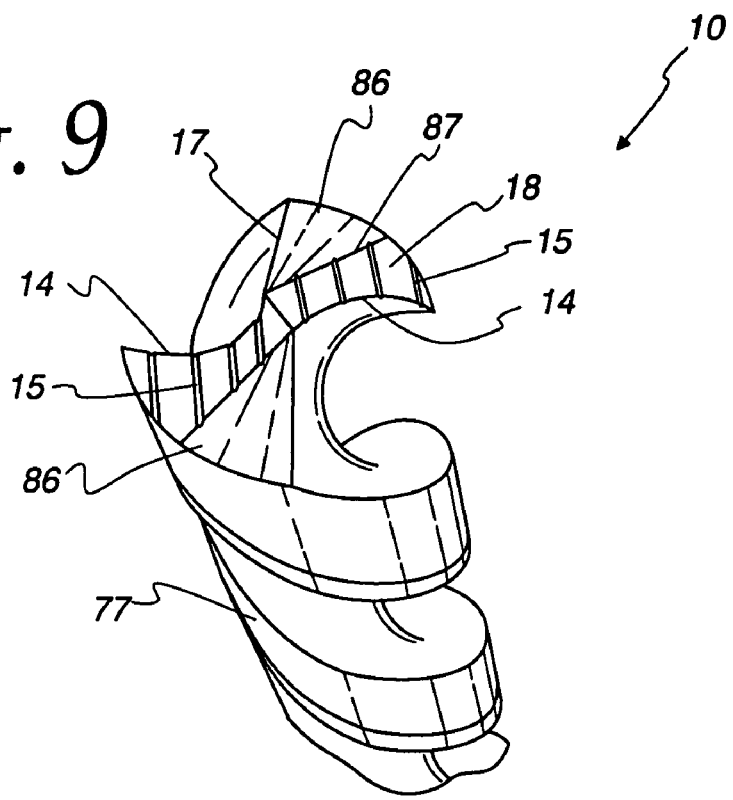
FIG. 9 is a perspective view of a left-hand drill terminating with a fastener extraction device, in accordance with features of the present invention.

Curved flutes and curved cutting edges 14 are also shown also in FIGS. 9, 10a through 10f, and 13a, 13b, and 14. In FIG. 9 such flutes define an extended helix or spiral along a longitudinally extending section of the periphery of the bit and about its circumference. These curved flutes are further defined by serrations along their edges or rims. The edges face in a direction the bit is to be rotated to extract fasteners. Thus, for jobs requiring extraction of right-hand fasteners, the serrations would belong on flute edges facing in a counterclockwise direction.

Optionally, instead of, or in addition to the serrations extending across the fastener engaging surfaces 24, 26, serrations 36 also are provided which extend along interior wall portions 33, 35 of the notches 32, 34 from the corresponding cutting edges 14a, 14b (See dotted lines in FIG. 8). As with the serrations extending across the fastener engaging surfaces 24, 26, the serrations 36 may extend across only a portion of the wall portions to both enhance engagement with a corresponding slot portion of the fastener 18 and maintain structural integrity of the tool 10.

As with the cutting and non-cutting edges of the other embodiments in this invention, the regions between the cutting edges 14 and non-cutting edges 17 define a frusto-conical surface 18 of the bit such that this surface lies intermediate the cutting and respective non-cutting edge. Although FIG. 8 depicts angles A and B having equal magnitudes, the angles A and B subtended by the notches respectively may vary to cooperate with design or damaged configurations of the slot portions of the fastener 18. Although FIG. 8 depicts angles A and B having equal magnitudes, the angles A and B subtended by the notches respectively may vary to cooperate with design or damaged configurations of the slot portions of the fastener. This substantially congruent engagement results between the first and second extending notches of the fastener engagement end and the slot portions of the fastener to provide increased torque from the tool. This substantially congruent engagement results between the first and second extending notches of the fastener engagement end and the slot portions of the fastener to provide increased torque from the tool to the fastener.

Also, where serrations are provided on the curved cutting edges 14 as shown in FIGS. 7-9, 10a through 10f, and 13a, 13b, and 14 such serrations may be lineal (i.e. straight or rectilinear), arcuate, segmented, radial (i.e. circular) or combinations thereof. Further, when the serrations 36 include a lineal configuration, the longitudinal axis .epsilon. of the serrations 36 may be orientated perpendicularly, parallel or inclined to the longitudinal axis α of the tool 10. (See FIG. 7b). A feature of the linear serrations configurations is that as the device is rotated, the tooth 15 is continuously forced to engage or cut into new material in the fastener head. Also the non-cutting edges 17 may be curved or rectilinear.

Figure 10A:
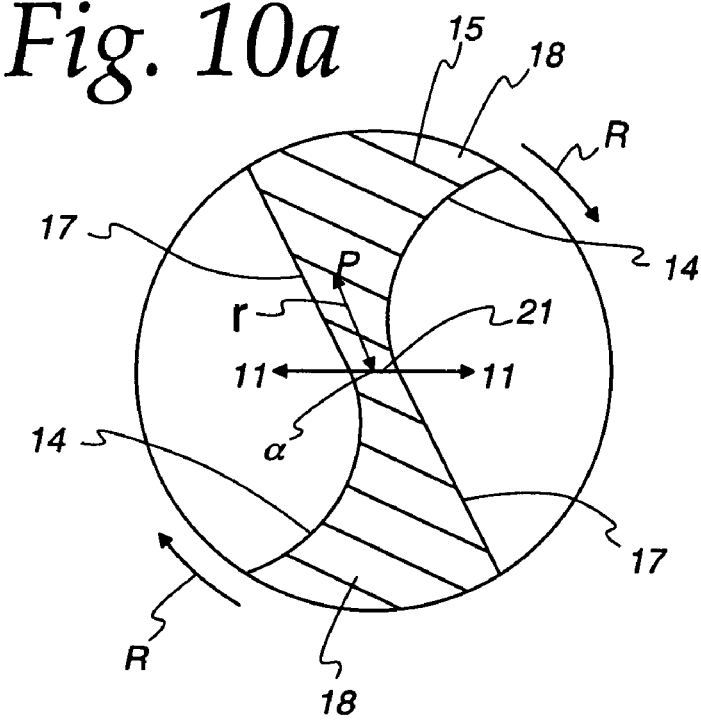
FIG. 10a is a top view of an alternate embodiment of the invented bit taken along the line 1bb-1bb of FIG. 1ba, in accordance with features of the present invention.
Figure 10B:
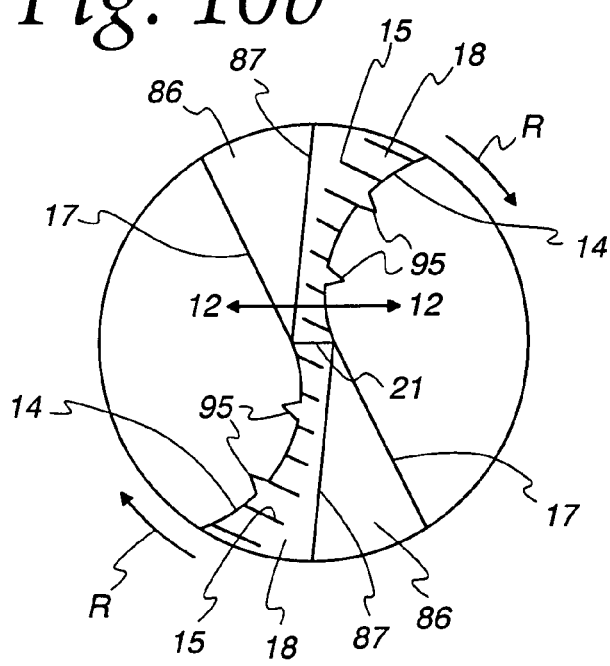
FIG. 10b is a top view of an alternate embodiment of the invented bit taken along the line 1bb-1bb of FIG. 1ba, in accordance with features of the present invention.
Figure 11:
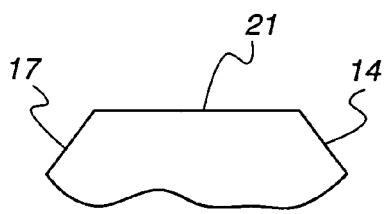
FIG. 11 is a cross-sectional view of FIG. 10a along the line 11-11.
Figure 12:
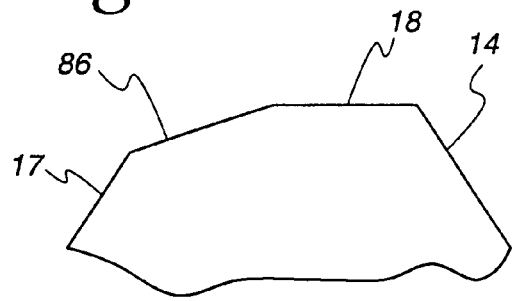
FIG. 12 is a cross-sectional view of FIG. 10b along the line 12-12.

FIG. 7a is a perspective view of an extractor bit with curved cutting edges, only one of which, edge 14a is visible. FIGS. 8, 10a through 10f, and 13b are top views of the invented bit depicting a variety of configurations of cutting edges 14 and teeth 15. It can be easily appreciated that features depicted in a given configuration can be incorporated in another configuration. FIG. 8 is a top view of FIG. 7a taken along line 8-8. It depicts lineal serrations 36a, 36b which extend orthogonal to a plane containing the longitudinal axis α of the tool 10. FIGS. 10a through 10f and 13b are top views of alternate embodiments of the invented bit taken along the line 1bb-1bb of FIG. 1ba (FIG. 11 is a view of FIG. 10a along the line 11-11). FIG. 10a depicts lineal serrations with teeth 15 lying on planes orthogonal to the longitudinal axis α of the tool 10 but so oriented that the radial distance r between the longitudinal axis α of the tool 10 and a point p on a tooth 15 increases as the shortest distance between p and the cutting edge 14 increases. While the teeth 15 in FIG. 10a are depicted as being parallel, this need not be the case. The cutting edge 14 in FIG. 10a is curved presenting a concave cutting edge facing in the direction R in which the device is rotated. FIG. 10b depicts lineal serrations with teeth 15 each of which is orthogonal to the curved cutting edge 14 of the tool. FIG. 10b also features a multi-tiered traction surface comprising a frusto-conical surface 18 adjacent to the cutting edge 14 abutting a relief surface 86. The relief surface 86 defines a steeper angle with respect to the axis of the bit a compared to the frusto-conical surface 18. (This is depicted in detail in FIG. 12 which is a section of FIG. 10b along the line 12-12.) Finally, the teeth 15 in FIG. 10b extend only over a fraction of the distance between the cutting edge 14 and the line 87 marking the demarcation between the regions 18 and 86. The two-tiered traction surface in FIG. 10b provides the wobbling features discussed in connection with FIG. 7a.

Figure 10C:
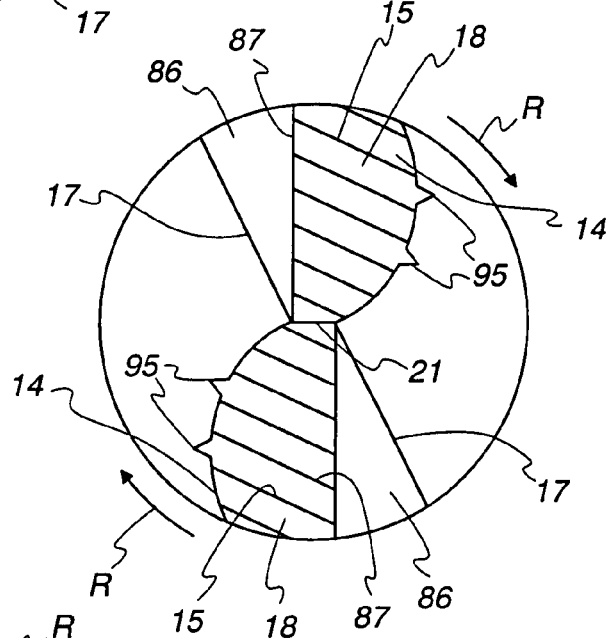
FIG. 10c is a top view of an alternate embodiment of the invented bit taken along the line 1bb-1bb of FIG. 1ba, in accordance with features of the present invention.

FIG. 10c depicts another embodiment of the curved cutting edges of the presently invented bit. It features a convex curved cutting edge 14 together with pointed protuberances 95, configured as spikes, extending parallel to the axis of the bit along the notch surfaces 16 (See FIG. 1aa). The protuberances 95 point in a direction perpendicular to the axis of the bit, In addition serrations with teeth 15 extend along planes perpendicular to the axis of the bit.

Figure 10D:
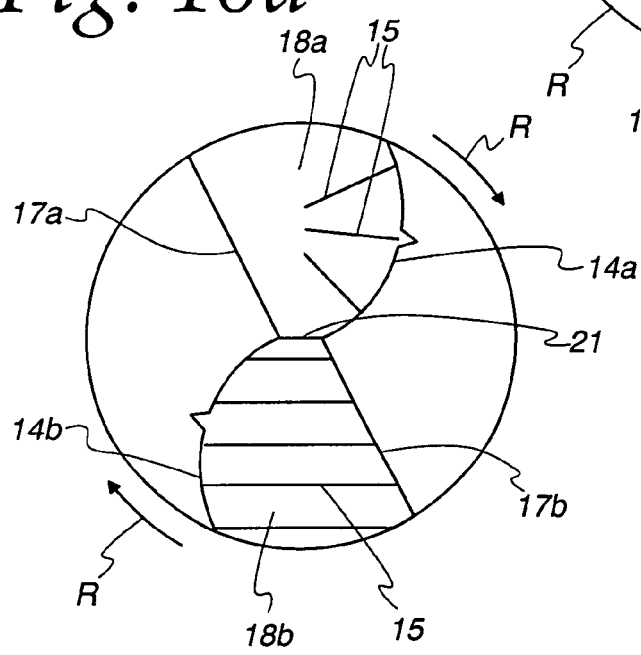
FIG. 10d is a top view of an alternate embodiment of the invented bit taken along the line 1bb-1bb of FIG. 1ba, in accordance with features of the present invention.

In FIG. 10c the configuration of the teeth 15 is the same as in FIG. 10a but the configuration of the traction surfaces 18 and relief surfaces 86 is the same as in FIG. 10b. In FIG. 10d the teeth-defining serrations 15 of the traction surface 18a are orthogonal to the cutting edge 14a while the teeth 15 on the surface 18b are orthogonal to a plane parallel to the axis of the bit.

Figure 10E:
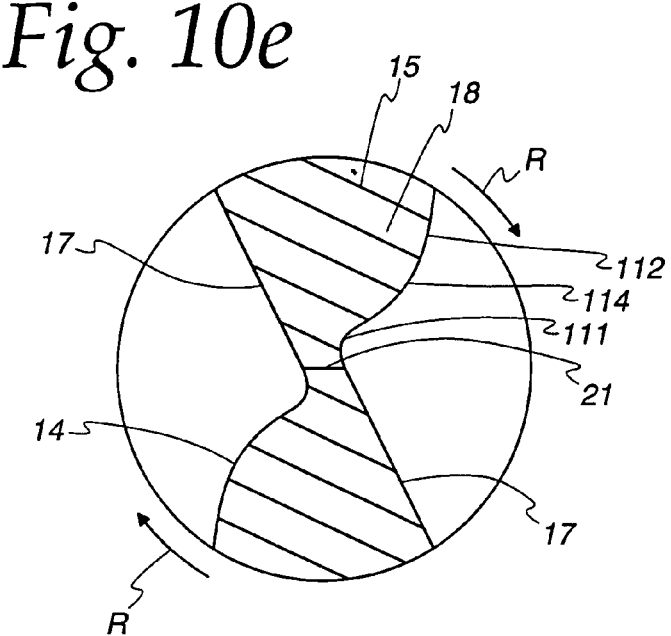
FIG. 10e is a top view of an alternate embodiment of the invented bit taken along the line 1bb-1bb of FIG. 1ba, in accordance with features of the present invention.
Figure 10F:
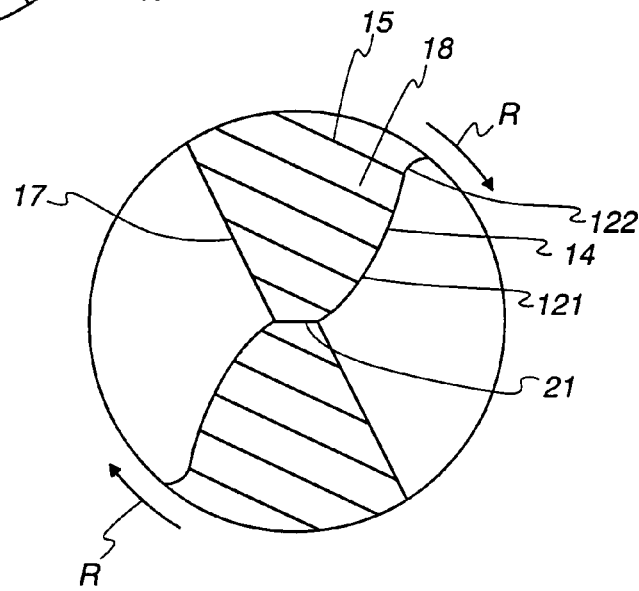
FIG. 10f is a top view of an alternate embodiment of the invented bit taken along the line 1bb-1bb of FIG. 1ba, in accordance with features of the present invention.

FIGS. 10e and 10f depict yet another embodiment of the curved cutting edges of the presently invented bit. In FIG. 10e the curved edge 14 has a concave section 111 in a region proximal to the tip region 21 of the bit and a convex region 112 in a region distal and radially displaced from the tip 21. FIG. 10f has a convex section 121 in a region proximal to the tip region 21 of the bit and a concave region 122 in a region distal from the tip 21 such that the concave region 122 extends to and intersects with the periphery of the bit.

FIGS. 13a is and 13b present a side and a top view, respectively, of an alternate embodiment of the teeth on the traction surfaces of the presently invented bit. The teeth 15 on the traction surface 18 in the present embodiment define spiral sections such that the distance r from the tip 21 to a point p on a tooth 15 decreases as the distance between p and the cutting edge 14 increases. Preferably, the pitch of the spiral defined by the teeth 15 should be the same as that of the screw-thread of the fastener being extracted. As shown in FIG. 13a, in this embodiment rotation in the direction R of the bit into the fastener to be extracted produces a force F on the fastener. This force F is in the direction in which the fastener is intended to move. In some cases, it may be desirable to have configurations where the teeth 15 on the traction surface 18 define spiral sections such that the distance r from the tip 21 of a point p on a tooth 15 increases as the distance r between p and the cutting edge 14 increases.

FIG. 9 depicts a fastener-remover/left-hand drill combination. The fastener remover 10 depicted in FIG. 9 constitutes the tip 77 of a left-handed drill. The fastener remover tip combines the rectilinear teeth 15 featured in FIG. 10a and the multi-tiered traction surface with a relief surface 86 featured in FIG. 10b. The fastener-extracting device comprises non-linear cutting edges 14, non-cutting edges 17, and rectilinear teeth 15 on the traction surfaces 18. The tip also features a multi-tiered traction surface comprising the frusto-conical surface 18 adjacent to the cutting edge 14 abutting a relief surface 86. The relief surface 86 defines a steeper angle with respect to the axis of the bit compared to the frusto-conical surface 18. The fastener-extractor features of the tip of a drill bit such as that depicted in FIG. 9 may comprise any or several combinations of cutting-edge, traction surface, serrations and teeth depicted in the present specification. The advantage of the extractor tip/drill bit combination is that it allows simultaneous boring into the fastener and application of an extracting torque. The extracting torque is more effective as the tip penetrates deeper into the fastener. Moreover, the vibrations produced by the boring facilitate disengagement of the fastener thread from the workpiece and allow easier fastener extraction.

Figure 14:
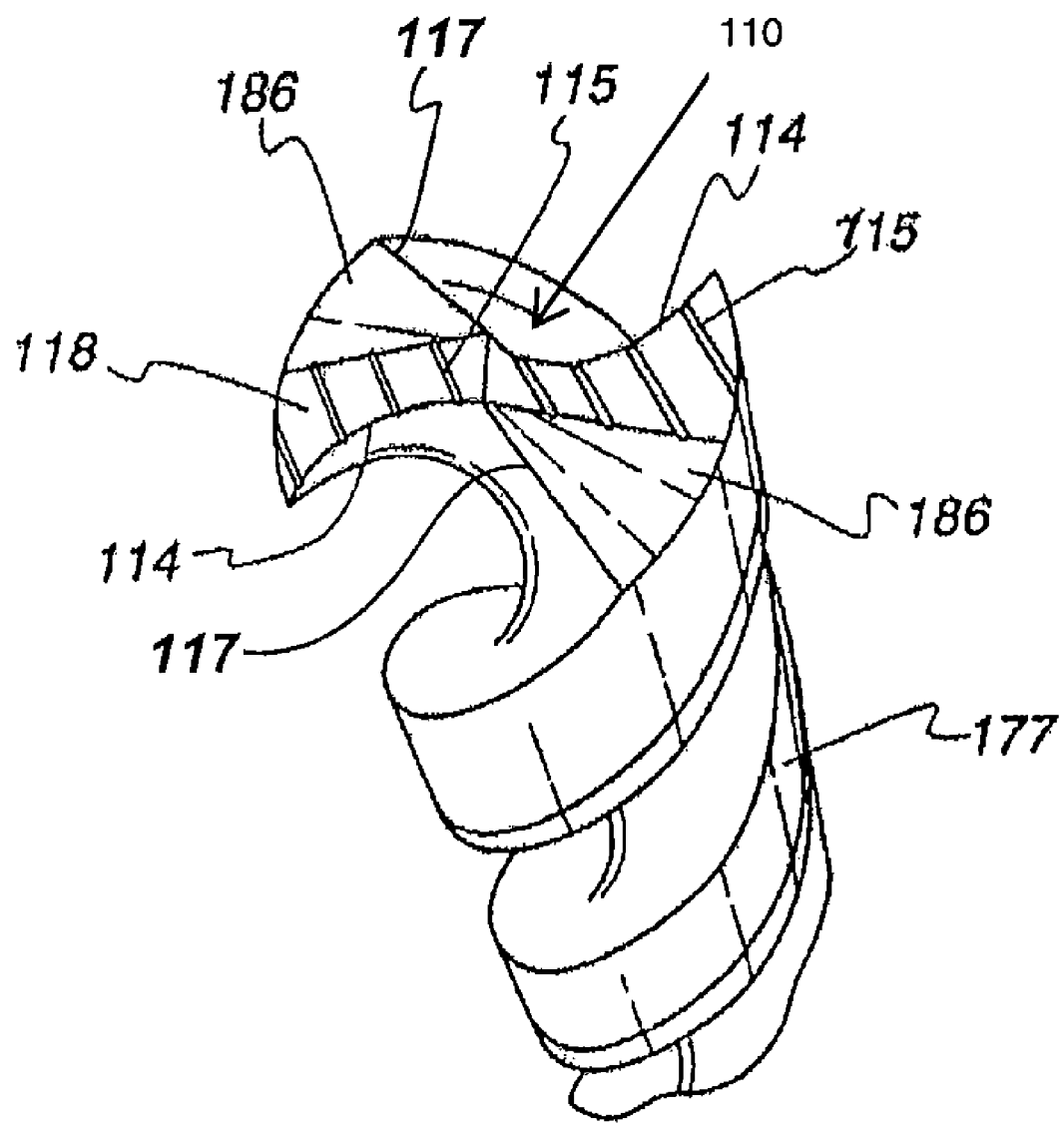
FIG. 14 is a perspective view of a right-hand drill terminating with a fastener extraction device, in accordance with features of the present invention.

The features depicted in FIG. 9 can also be incorporated in a right-handed drill bit. This is depicted in FIG. 14 wherein the tip 110 of a right-handed drill bit 177 constitutes a fastener extractor for left-handed fasteners. The fastener remover tip 110 combines the rectilinear teeth featured in FIG. 10a and the multi-tiered traction surface with a relief surface featured in FIG. 10b. The fastener-extracting device comprises non-linear cutting edges 114, non-cutting edges 117, and rectilinear teeth 115 on the traction surfaces 118. The tip 110 also features a multi-tiered traction surface comprising the frusto-conical surface 118 adjacent to the cutting edge 114 abutting a relief surface 186. The relief surface 186 defines a steeper angle with respect to the axis of the bit compared to the frusto-conical surface 118. The fastener-extractor features of the tip of a drill bit such as that depicted in FIG. 14 may comprise any or several combinations of cutting-edge, traction surface, serrations and teeth depicted in the present specification.

Also, the invented bits can be configured to include a means for preventing the bits from dislodging from broken fasteners once engagement with said fasteners occurs. In this regard, "finders" may be installed. These are accessories associated with, and co-axial to, the shanks of the bits and in slidable communication therewith. Generally configured as cylinders, sleeves, chucks, or collets, the finders are adapted to slide over the periphery of a fastener which is held fast in a work piece. As such, the finders maintain the bit in a position coaxial to the longitudinal axis of the fastener to assure adequate embedding of the bit into the fastener. The finder also prevents jumping or skipping of the bit from the fastener to adjacent surfaces of the workpiece, thus preventing marring or scuffing of said workpiece.

Another addition to the invented device is the positioning of a collar or radial projection about the circumference of the device. The collar or projection would be positioned intermediate the first and second end of the device and serve as a means for preventing penetration of the device into the fastener beyond the distance defined by the tip 19 of the device and the position of the collar.

While the invention has been described in the foregoing with reference to details of the illustrated embodiment, these details are not intended to limit the scope of the invention as defined in the appended claims.

The embodiment of the invention in which an exclusive property or privilege is claimed is defined as follows:

1. A bit for removing a fastener from a work piece, said bit comprising:
  a) an elongated shaft with a longitudinal axis, said shaft having a first end, and a second end, said first end terminating in a tip and said second end of the shaft configured to be received by a tool which provides rotational torque;
  b) a plurality of non-cutting edges and a plurality of cutting edges, each of the non-cutting edges and cutting edges extending continuously from said tip to a bit periphery, said cutting edges configured to cut into a fastener when the bit is rotated in a direction opposite to an engagement direction of the fastener, and said cutting edges and said non-cutting edges alternating with each-other;
  c) a plurality of traction surfaces to grip the fastener, each traction surface extending from a respective one of the plurality of cutting edges and defining a first surface angle to the longitudinal axis and wherein at least one traction surface comprises a plurality of lineal serrations that extend across at least a portion of the at least one traction surface; and d) a plurality of relief surfaces extending between a respective one of the plurality of traction surfaces and a respective one of the plurality of non-cutting edges, each relief surface defining a second surface angle to the longitudinal axis which is different than the first surface angle.

2. The bit as recited in claim 1 further comprising two or more flutes extending longitudinally along the shaft and positioned intermediate said cutting edges.

3. The bit as recited in claim 2 wherein at has one of the flutes defines a helical surface which extends along a longitudinally extending surffice of a periphery of the bit so that said bit constitutes a drill bit.

4. The bit as recited in claim 3 wherein the flutes arc defined by the cutting edges and a portion of each of the serrations are positioned on the cutting edge.

5. The bit as recited in claim 1 wherein said serrations define a plurality of teeth on the cutting edges.

6. The bit as recited in claim 5 wherein said teeth are rectilinear.

7. The bit as recited in claim 5 wherein one or more of said teeth defines spiral segments on said traction surfaces.

8. The bit as recited in claim 5 wherein said teeth are axially asymmetric.

9. The bit as recited in claim 1 wherein one or more of said cutting edges comprises one or more concave sections.

10. The bit of claim 1, wherein the plurality of cutting edges comprises at least first and second cutting edges, the first cutting edge defining a first cutting edge angle to the longitudinal axis and the second cutting edge defining a second cutting edge angle to the longitudinal axis, the first cutting edge angle being different than the second cutting edge angle.

11. The bit of claim 1, wherein the plurality of serrations extend across at least a portion of the one or more traction surfaces.

12. The bit of claim 11, wherein the plurality of serrations extend completely across the one or more traction surfaces.

13. The bit of claim 1, wherein the plurality of traction surfaces comprises at least first and second traction surfaces and the plurality of serrations comprises a first plurality of serrations formed on the first traction surface and a second plurality of serrations formed on the second traction surface.

14. The bit of claim 13, wherein the first plurality of serrations is aligned with the second plurality of serrations.

15. The bit of claim 13, wherein the first plurality of serrations is offset from the second plurality of serrations.

16. The bit of claim 1, wherein the plurality of relief surfaces each define a steeper angle relative to the longitudinal axis than the plurality of traction surfaces so that the plurality of relief surfaces are spaced apart from the fastener when the plurality of traction surfaces are gripping the fastener.

17. The bit of claim 1, wherein the plurality of relief surfaces are free from serrations.

18. The bit of claim 1, wherein at least some of the plurality of cutting edges comprise a generally concave cutting edge extending between the tip and the hit periphery.

\* \* \* \* \*